United States Patent Office 3,758,324
Patented Sept. 11, 1973

3,758,324
CROSS-LINKING AGENTS FOR PAPER BINDERS AND PAPER COATED THEREWITH
Richard C. Barrett, New Milford, N.J., assignor to Allied Chemical Corporation, New York, N.Y.
No Drawing. Filed Dec. 23, 1971, Ser. No. 215,937
Int. Cl. C08b 25/02; C08f 45/24; C08h 1/00
U.S. Cl. 106—146
15 Claims

ABSTRACT OF THE DISCLOSURE

Cross-linking agents for paper binder coating compositions, which agents comprise compounds having the general formula:

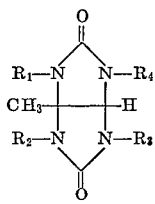

wherein $R_1$, $R_2$, $R_3$ and $R_4$ are hydrogen or hydroxyalkyl of 1 to 10 carbon atoms, with the proviso that at least one of $R_1$, $R_2$, $R_3$ and $R_4$ is hydroxyalkyl of 1 to 10 carbon atoms. Preferred compounds include mono-, di-, tri- and tetra-N-hydroxymethyl methylglycolurils.

BACKGROUND OF THE INVENTION

Field of the invention

This invention relates to cross-linking agents for binders used to coat paper and paper so coated.

Discussion of the prior art

Paper has been conventionally coated to prepare the same for subsequent printing. For this purpose, a coating composition is applied by any of a variety of conventional techniques to the paper surface. The coating renders the surface of paper smoother and less porous or absorptive and provides a more controlled ink receptivity. These coating compositions are usually aqueous compositions of a binder, a cross-linking agent or insolubilizing agent for the binder and a clay is incorporated as an opacifying agent and for other purposes. A catalyst and pigment may optionally be included in the compositions. Binders which have been employed for this purpose include cellulosic, proteinaceous and synthetic resin binders, such as polyvinyl alcohol, polyvinyl acetate, starch, casein and soya bean protein, and mixtures thereof. Conventional pigments utilized in the coating composition include titanium dioxide and calcium carbonate.

Cross-lnking agents have been included in such compositions in order to cross-link the binder phase of the coating and thus improve the wet-rub properties of the coating. Cross-linking agents used heretofore include formaldehyde, glyoxal, urea and melamine resins.

Although such coating compositions have been effective to provide water and other liquid resistance to papers, it has been observed that by adding a cross-linking agent, the viscosity of the composition increases and thus the composition pot life is reduced.

Objects of the invention

It is an object of the present invention to provide cross-linking agents for paper coating compositions used to prepare the paper for subsequent printing.

It is a further object of the invention to provide such cross-linking agents which are at least as effective as cross-linking agents heretofore employed in paper coating compositions and which form coating compositions having increased pot life.

Other objects of the invention may be apparent from the description which follows.

SUMMARY OF THE INVENTION

In accordance with the present invention, cross-linking agents for paper binder coating compositions are provided which comprise N-hydroxyalkyl methylglycolurils having 1 to 4 hydroxyalkyl substituents of 1 to 10 carbon atoms. Paper coating compositions comprising a binder, a clay and the instant substituted methylglycolurils as cross-linking agent are capable of providing a non-porous coating on the paper and do not evidence as rapid an increase in viscosity in comparison to coating compositions utilizing the heretofore employed cross-linking agents and therefore have an increased pot life.

DESCRIPTION OF THE PREFERRED EMBODIMENT

N-hydroxyalkyl methylglycoluril compounds are employed as cross-linking agents for paper coating compositions. The compounds include mono-, di-, tri- and tetra-N-hydroxyalkyl methylglycolurils, with 1 to 10 carbon atoms in the hydroxyalkyl substituent. The compounds utilized in this invention have the general formula:

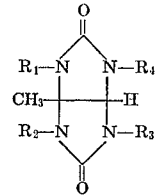

wherein $R_1$, $R_2$, $R_3$ and $R_4$ are hydrogen or hydroxyalkyl of 1 to 10 carbon atoms, with the proviso that at least one of $R_1$, $R_2$, $R_3$ and $R_4$ is hydroxyalkyl of 1 to 10 carbon atoms. Preferred compounds include mono-, di-, tri- and tetra-N-hydroxymethyl methylglycolurils. The most preferred compound is N,N',N'',N'''-tetra-(hydroxymethyl)-7-methylglycoluril.

The N-hydroxyalkyl methylglycoluril compounds may be prepared by reacting 7-methylglycoluril with an aldehyde under suitable conditions. 7-methylglycoluril (MGU), also known as methylglyoxal urein, diurein of methylglyoxal, methylacetylene diurein and methylacetylenuril, has the structural formula:

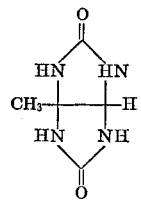

The N-hydroxyalkyl methylglycoluril compounds utilized in this invention are formed as the reaction products of MGU and an aldehyde having the general formula RCHO, wherein R is hydrogen or an aliphatic hydrocarbon having 1 to 10 carbon atoms. Formaldehyde is the preferred aldehyde.

Hydroxymethyl substituted methylglycolurils may be formed, for example, by heating MGU with formaldehyde at a temperature of about 45 to 100° C. in an aqueous alkaline solution containing potassium hydroxide in an amount sufficient to establish a pH of about 7–9. The reaction mixture, which after cooling has a pH of between 7–8, is adjusted with dilute sulfuric acid to a pH of about 7. Sufficient formaldehyde, on a molal basis, is provided to obtain mono-, di-, tri- and tetra-N-hydroxymethyl MGU, as desired. For example, by providing about 4 mols of formaldehyde per mol of MGU, the product N,N',N'',N''' - tetra-(hydroxymethyl) methylglycoluril is obtained, which product has the formula:

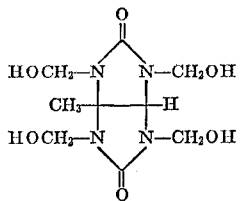

The cross-linking agents of this invention may be employed in aqueous paper coating compositions which include cellulosic, proteinaceous and synthetic resin binders, and mixture thereof, and clay. Examples of binders or adhesives include synthetic alcohols, such as polyvinyl alcohol, starch, casein, soya bean protein and polyvinyl acetates. The presently preferred binder is polyvinyl alcohol. As is conventional, binder is included in the paper coating composition in an amount of, for example, about 1 to 30 percent by weight based upon the weight of clay and binder, with clay comprising the remaining 70 to 99 percent. Preferably, binder comprises about 5 to 25 percent of the weight of binder and clay. The cross-linking agents of this invention are present in the composition in an amount of at least about 3 percent based on the weight of the binder, and preferably about 5 to 30 percent. Pigments may optionally be included in the coating composition in an amount of about 10 to about 100 percent by weight based upon the weight of clay, preferably about 20 to 50 percent by weight. Examples of suitable pigments include titanium dioxide and calcium carbonate. Conventional additives may be included in their usual amounts.

Also preferably included in the composition is a catalyst for the cross-linking agent. Catalysts include acid salt catalysts such as zinc nitrate, magnesium chloride, zinc sulfate, etc. and para-toluene sulfonic acids and are included in the range of about 5 to 20 percent, based upon the weight of the binder.

Coating compositions including the cross-linking agents of this invention can be used to coat any grade of printing paper on conventional apparatus to provide cross-linked, insoluble coatings from coating compositions which do not evidence an unacceptable rise in viscosity.

The invention will be further illustrated by the following examples, but it is to be understood that the invention is not to be limited by the details disclosed therein. In the examples, parts and percentages are by weight unless otherwise noted.

EXAMPLE 1

N,N',N'',N''' - tetra - (hydroxymethyl) - 7 - methylglycoluril is employed as a cross-linking agent for a starch binder in a paper coating formulation. A starch solution is prepared by mixing with agitation 30 grams of dry starch (Cato Kote 485 from National Starch & Chemicals Corp.) with 200 ml. of distilled water, heating the solution to 190 to 210° F. for 20 to 30 minutes, adjusting the pH to 6.0 to 7.0, cooling the solution to 120° F. while maintaining agitation for 15 minutes and cooling to room temperature. A clay slurry is prepared by mixing with agitation 90 grams kaolin clay (Grade KCS–SD from Georgia Kaolin Company) and 10 grams of $TiO_2$ (Grade Kaogan 7 from Georgia Kaolin Company) with 150 ml. distilled water. 0.6 gram $NH_4OH$ is added as a dispersant. The slurry is agitated for 20 to 30 minutes. To this clay slurry, 100 ml. of the starch solution is added under agitation. Agitation is continued for 15 minutes and the cross-linking agent in amounts of 10, 15 and 20 percent, based upon the weight of starch, and zinc nitrate catalyst in an amount of 10 percent, based upon the weight of starch, is added to the composition and the composition is further agitated to thoroughly disperse the ingredients. The cross-linking agent employed is N,N',N'',N'''-tetra-(hydroxymethyl)-7-methylglycoluril. As comparative examples, identical compositions are formulated except that glyoxal is used as the cross-linking agent.

The coating compositions are coated onto sheets of bond paper containing 25 percent cotton fiber using a No. 24 Mayer coating bar and the coated sheets are dried for 3 minutes at 150° C. in a circulating air oven. The coated sheets are tested for wax pick and wet-rub resistance.

Wet-rub resistance of the samples is qualitatively measured to indicate the degree of insolubilization imparted to the coating by the cross-linking agent. A wet-rub test is performed by placing one drop of water on the coated sample and rubbing with a finger tip for 10, 15 or 20 seconds. The rubbing motion is kept within a 3 inch horizontal limit. The finger tip is then imprinted onto a piece of black construction paper, with the coating that is abraded from the coated surface being transferred to the black paper. Upon drying, the removed pigment becomes visible on the dark background. Visual examination of the transferred prints indicates the apparent effectiveness of the cross-linking agent.

The wet-rub tests show that at a level of 10 percent cross-linking agent, glyoxal, is slightly more effective than N,N',N'',N'''-tetra-(hydroxymethyl) - 7 - methylglycoluril. At a level of 15 and 20 percent cross-linking agent, no difference is detected between the two agents.

Wax pick tests are performed on the 10 percent N,N',N'',N'''-tetra-(hydroxymethyl) - 7 - methylglycoluril sample and, as a comparison, on the 10 percent glyoxal sample. The wax pick test is a measurement of the coating strength or resistance to pick and is performed in accordance with suggested TAPPI method T 459 su 65. In this test, sealing waxes with increasing adhesive powers are pulled from the surface of the samples. The highest number of the wax which does not disturb the surface of the paper is the numerical rating of the pick. The tests show that the samples having the same wax pick number (7A), indicating that the samples have similar coating strengths. Similar tests are performed on the 15 percent and 20 percent cross-linking agent samples and results again indicate similar coating strengths.

EXAMPLE 2

N,N',N'',N'''-tetra-(hydroxymethyl) - 7-methylglycoluril is employed as a cross-linking agent in a polyvinyl alcohol (PVA) based paper coating. A 10 percent PVA solution is prepared by adding 30 grams of fully hydrolyzed PVA (Elvanol Grade 71–30 G Med. from du Pont) to 300 ml. of distilled water and the mixture is heated to 75–80° C. under agitation until solution occurs. The solution is maintained at the above temperature for 20–30 minutes under constant mixing and is then cooled to room temperature. A clay slurry is prepared following the procedure of Example 1, with the clay slurry being agitated for 30 minutes at high speed to ensure deflocculation. To the agitating clay slurry, PVA solution is added at a ratio of 5 parts PVA per 100 parts of pigment. The mixture is agitated for 30–45 minutes at moderate speed. To a 100 ml. portion of the mixture is added cross-linking agent in an amount of 5 percent, 10 percent and 20 percent based upon the weight of the binder. The cross-linking agent employed is N,N',N'',N'''-tetra-(hydroxymethyl)-7-methylglycoluril. As a comparison, similar compositions are formulated with glyoxal being employed as the cross-linking agent. Catalyst is added at a 10 percent amount based on the weight of the binder. Zinc nitrate and magnesium chloride are separately employed as catalysts.

The above compositions are used to coat permanized plain bond paper sheets containing 25 percent cotton fiber under the conditions indicated in Example 1. Approximately 3 lbs. solids per 3000 sq. ft. is coated on the paper.

The samples are subjected to a wax pick test and a wet-rub test as in Example 1. It is noted that the coatings employing N,N',N'',N'''-tetra-(hydroxymethyl)-7-methylglycoluril are virtually equivalent in wet-rub resistance as compared to the glyoxal coatings at levels of 5, 10 and 20 percent cross-linking agent.

For the wax pick test, coated samples formed from 10 percent, 20 percent and 30 percent cross-linking agent (based upon the weight of binder) are compared. With zinc nitrate catalyst, the wax pick number is identical for the N,N',N'',N'''-tetra-(hydroxymethyl-7-methylglycoluril and the glyoxal whereas with magnesium chloride catalyst (at 20 perecnt cross-linking agent concentration), glyoxal has a slightly lower wax pick number.

EXAMPLE 3

N,N',N'',N'''-tetra-(hydroxymethyl)-7-methylglycoluril is employed as a cross-linking agent in a casein based paper coating. A 15 percent casein slurry (casein is Nation Casein LT from National Casein) in distilled water having a pH of 9.2 is prepared and slightly agitated for 10 minutes, followed by heating to 160–180° F. for 30–45 minutes. The slurry is cooled to 140° F. and ammonium hydroxide (28 percent) at a 7–10 parts per 100 parts casein ratio is added. The slurry is then maintained at 140° F. for 15 minutes after which it is cooled to room temperature. A clay slurry is formed with 7–10 percent $TiO_2$ pigment and 40–43 percent clay, and the casein and clay slurries are mixed. To the mixture is added N,N',N'',N'''-tetra-(hydroxymethyl)-7-methylglycoluril cross-linking agent in an amount of 3 percent based on the weight of the casein. As a comparison, formaldehyde and glyoxal are separately employed as the cross-linking agent in similar amounts. No catalyst is used.

The compositions are coated onto paper as in Example 2. Wet-rub tests show approximately equivalent results for all three cross-linking agents.

Wax pick tests are performed on samples which are coated from formulations employing 100 grams of 40 percent solids clay slurry, 46 grams of 15 percent casein solution, 10 percent of zinc nitrate catalyst based upon the weight of the casein and 3 and 5 percent levels of cross-linking agent based upon the weight of the casein. N,N',N'',N'''-tetra-(hydroxymethyl)-7-methylglycoluril cross-linking agent is compared to glyoxal and formaldehyde cross-linking agents, and no significant differences are apparent.

The viscosity of casein binder coating compositions is measured using a Brookfield viscometer to measure the increase in viscosity following the addition of cross-linking agent. A 7.5 percent casein solution is formulated, and 5 parts of N,N',N'',N'''-tetra-(hydroxymethyl)-7-methylglycoluril cross-linking agent is added thereto. As a comparison, solutions are formulated using 3 percent formaldehyde as the cross-linking agent. Viscosity is observed as a function of time, and the results are tabulated in the table. The results indicate that a cross-linking agent of this invention produces less viscosity increase than formaldehyde.

TABLE I.—VISCOSITY OF CASEIN BASED COMPOSITIONS

| Time (min.) | Viscosity (cp.) | |
|---|---|---|
| | Formaldehyde | N,N',N'',N'''-tetra-(hydroxymethyl)-7-methylglycoluril |
| 0 | 850 | 1,180 |
| 1 | 850 | 1,450 |
| 1.5 | 950 | 1,600 |
| 2 | 1,000 | 1,750 |
| 3 | 6,500 | 2,450 |
| 4 | 16,200 | 3,950 |
| 5 | (1) | 6,300 |
| 6 | (1) | 13,100 |
| 7 | (1) | 23,000 |

1 Indicates reading is off scale.

The viscosity increase noted in Example 3 is pH dependent since casein solutions prepared to a pH of 9.0 to 9.5 gel rapidly whereas rapid gelation does not occur at a pH of 7.0 to 8.0 although the viscosity increases over a period of several hours. However, in the pH range of 7.0 to 8.0 viscosity increases are more pronounced for a casein-formaldehyde composition than for a casein-N,N',N'',N'''-tetra-(hydroxymethyl)-7-methylglycoluril composition. For example, 5 hours after formulation, a casein-formaldehyde composition having a pH of 7.5 measures a viscosity of 5500 cps. whereas a casein-N,N',N'',N'''-tetra-(hydroxymethyl)-7-methylglycoluril composition of equal strength measures a viscosity of 300 cps.

It should be apparent from the above examples that coating compositions including cross-linking agents of this invention when compared to similar compositions employing conventional cross-linking agents have at least equal wet-rub resistance and coating strength, and also do not exhibit as rapid an increase in viscosity. The lower rate of increase in viscosity is important since it provides the coating composition with increased pot life.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. In a process for coating paper to render the surface non-porous comprising applying to the paper an aqueous coating composition which comprises a binder, a cross-linking agent for said binder, and a clay, wherein said binder is selected from the group consisting of polyvinyl alcohol, starch, casein, soya bean protein and polyvinyl acetate and mixtures thereof, the improvement comprising:

utilizing as said cross-linking agent a compound having the general formula

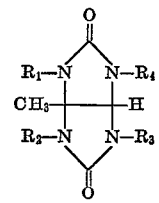

wherein $R_1$, $R_2$, $R_3$ and $R_4$ are hydrogen or hydroxymethyl, with the proviso that at least one of $R_1$, $R_2$, $R_3$ and $R_4$ is hydroxymethyl, said compound being present in an amount of at least 3 percent by weight based on the weight of the binder.

2. The process of claim 1 wherein said coating composition comprises by weight about 1 to 30 percent binder based on the combined weight of binder and clay.

3. The process of claim 2 wherein said coating composition includes a catalyst present in an amount of about 5 to 20 percent by weight based on the weight of the binder, and wherein said cross-linking agent is present in an amount of about 5 to 30 percent by weight based on the weight of the binder.

4. The process of claim 3 wherein said catalyst is selected from the group consisting of zinc nitrate, magnesium chloride, zinc sulfate and para-toluene sulfonic acids.

5. The process of claim 1 wherein said cross-linking agent comprises N-(hydroxymethyl)-7-methylglycoluril.

6. The process of claim 1 wherein said cross-linking agent comprises N,N'-di-(hydroxymethyl)-7-methylglycoluril.

7. The process of claim 1 wherein said cross-linking agent comprises N,N'',N'''-tri-(hydroxymethyl)-7-methylglycoluril.

8. The process of claim 1 wherein said cross-linking agent comprises N,N',N'',N'''-tetra-(hydroxymethyl)-7-methylglycoluril.

9. The process of claim 1 wherein said coating composition includes a pigment.

10. The process of claim 1 including heating said paper subsequent to said coating.

11. A coated paper produced by the process of claim 1.

12. An aqueous paper coating composition comprising
a binder selected from the group consisting of polyvinyl alcohol, starch, casein, soya bean protein and polyvinyl acetate, and mixtures thereof,
a cross-linking agent having the general formula:

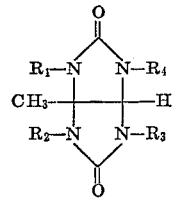

wherein $R_1$, $R_2$, $R_3$ and $R_4$ are hydrogen or hydroxymethyl, with the proviso that at least one of $R_1$, $R_2$, $R_3$ and $R_4$ is hydroxymethyl, said cross-linking agent being present in an amount of at least about 3 percent by weight based on the weight of said binder, and
a clay.

13. A composition as claimed in claim 12 including a catalyst selected from the group consisting of zinc nitrate, magnesium chloride, zinc sulfate and para-toluene sulfonic acids, said catalyst being present in an amount of about 5 to 20 percent by weight based upon the weight of said binder, and wherein said cross-linking agent is present in an amount of about 5 to 30 percent by weight based upon the weight of the binder.

14. A composition as claimed in claim 12 wherein said binder is present in an amount of about 1 to 30 percent by weight based on the weight of binder and clay.

15. A composition as claimed in claim 14 wherein said cross-linking agent comprises N,N',N'',N'''-tetra-(hydroxymethyl)-7-methylglycoluril.

References Cited
UNITED STATES PATENTS

| | | | |
|---|---|---|---|
| 2,880,107 | 3/1959 | Robinette | 106—213 |
| 3,091,617 | 5/1963 | Burris | 260—309.7 |
| 3,264,126 | 8/1966 | Ritson | 106—146 |
| 3,341,550 | 9/1967 | Vail et al. | 260—309.7 |
| 3,350,162 | 10/1967 | Beck | 106—213 |
| 3,363,973 | 1/1968 | Talet | 260—309.7 |
| 3,370,969 | 2/1968 | Powell et al. | 260—29.6 B |

ALLAN LIEBERMAN, Primary Examiner

U.S. Cl. X.R.

106—135, 137, 148, 154, 161, 203, 204, 213, 214; 117—155, 156, 157; 260—29.6 B